Aug. 4, 1970 J. J. GRADY 3,523,015
MOLTEN STEEL SLAG HANDLING PROCESS AND APPARATUS
Filed April 21, 1967 3 Sheets-Sheet 2

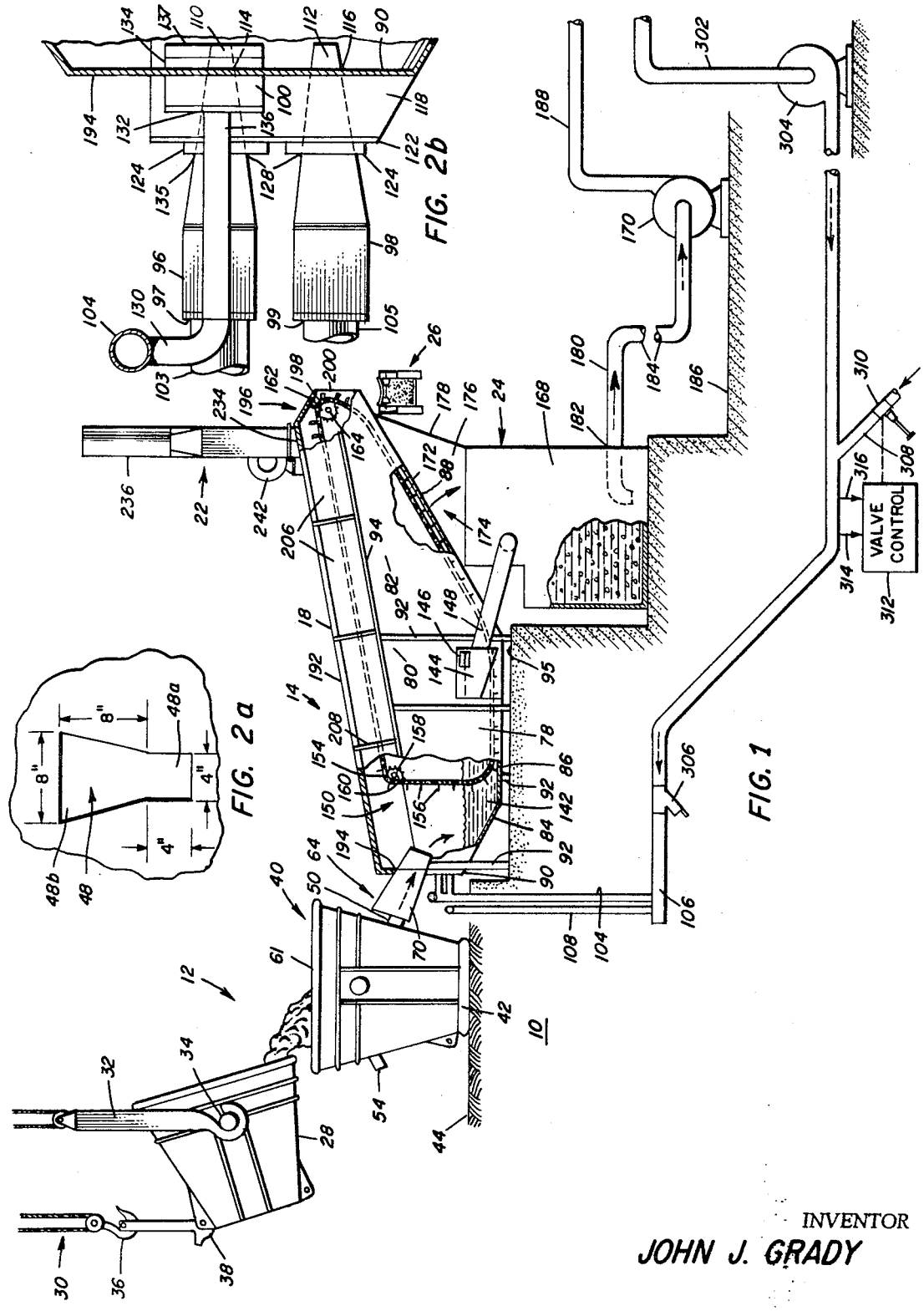

INVENTOR
JOHN J. GRADY
BY
ATTORNEYS

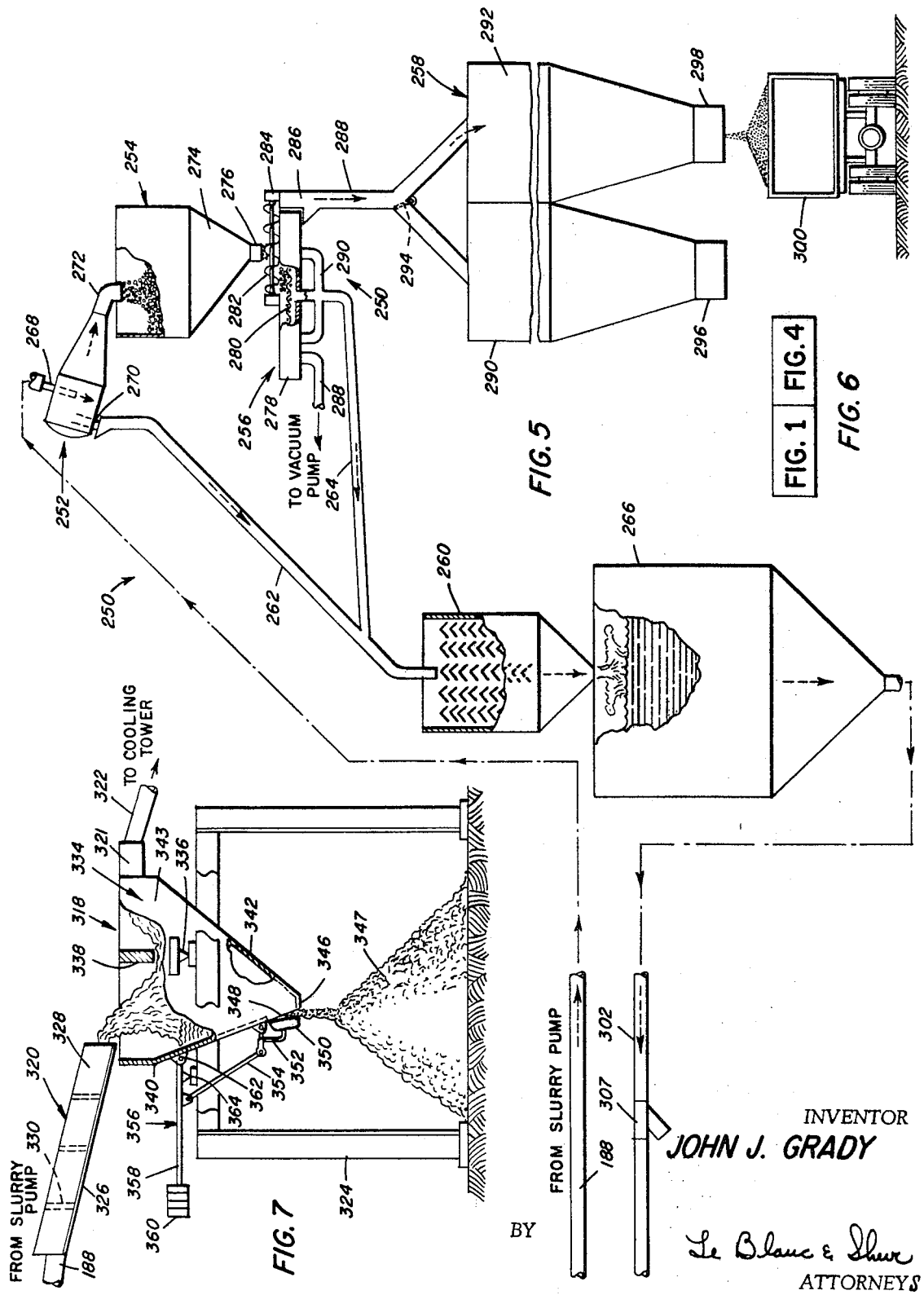

United States Patent Office 3,523,015
Patented Aug. 4, 1970

3,523,015
MOLTEN STEEL SLAG HANDLING PROCESS AND APPARATUS
John J. Grady, New Florence, Pa., assignor to International Steel Slag Corporation, Washington, D.C., a corporation of the District of Columbia
Continuation-in-part of applications Ser. No. 428,519, Jan. 27, 1965, and Ser. No. 535,143, Mar. 17, 1966, which are the continuations-in-part of application Ser. No. 126,792, June 21, 1961. This application Apr. 21, 1967, Ser. No. 632,822
The portion of the term of the patent subsequent to Apr. 25, 1984, has been disclaimed
Int. Cl. C03b 5/18
U.S. Cl. 65—19         17 Claims

ABSTRACT OF THE DISCLOSURE

A system is described for improved processing and disposal of molten steel slag formed during steel furnace operation. A "closed" hydraulic system includes a hydraulic transport arrangement for conveying the granulated and cooled steel slag away from the granulator in the form of a water-slag slurry. The "closed" hydraulic system also includes water recovery and slag drying apparatus including one or more slag separators and water filters, water cooling and storage apparatus, and recirculating apparatus for supplying water to the granulator water jet nozzles, including suitable pump means and make-up water supply control means to replace water lost from the system due to steam generation or incomplete slag dewatering.

INTRODUCTION

This application is a continuation-in-part of my copending application Ser. No. 428,519, filed Jan. 27, 1965, entitled "Steel Slag Handling System" now Pat. No. 3,316,075, and of copending application Ser. No. 535,143, entitled Steel Slag Handling System" filed Mar. 17, 1966, each of which is a continuation-in-part of my earlier application Ser. No. 126,792, filed June 21, 1961, and now abandoned.

Reference is also made by my copending U.S. patent application Ser. No. 629,755, filed Apr. 10, 1967, and to application Ser. No. 632,825, filed Apr. 21, 1967, both of which applications are directed to various portions of the system described herein.

THE INVENTION

The present invention relates to an improved system for the processing and disposal of molten slag discharged from a steel making furnace. More particularly, this invention relates to a "closed system" method and apparatus for granulating and cooling molten steel slag under required conditions, then removing the granulated slag from the granulator as a slag-water slurry, and subsequently removing the water to convert the slag to a substantially dry granular form, with the extracted water being recovered and cooled in the steel slag granulating process.

As discussed in considerable detail in the aforementioned "parent applications," Ser. Nos. 428,519 and 126,792, and related applications, the efficient, quick removal of large quantities of molten slag from open hearth and other steel making furnaces and the processing thereof, is a long standing major problem in the manufacture of steel. A tremendous amount of slag must be removed from the furnace each day and efficiently processed without interruption of furnace operation if maximum steel making capacity is to be realized.

The problems of handling and removing steel slag have been seriously increased by the U.S. steel industry's adoption within the past several years, of oxygen steel making furnaces, sometimes referred to as "OSM" or "BOF" furnaces. These furnaces are capable of producing steel in even larger quantities in shorter periods of time than many of the most up-to-date open hearth installations. For example, one steel company in the United States has produced about 240 tons of steel in 27 minutes, tap-to-tap, compared to 6–8 hours in modern open hearth furnaces. As will be appreciated, such oxygen steel making furnaces form large quantities of slag, e.g., on the order of 12%–16% of the heat tonnage. Thus, an OSM or BOF furnace producing about 200–250 tons of steel in 30–60 minutes will also produce about 35 tons of molten slag in 30–60 minutes. Such large quantities of molten slag must be rapidly removed and disposed of without interruption or delay in the operation of the furnace.

As further described in detail in my parent application Ser. No. 428,519, the steel making industry has employed numerous systems for slag processing and disposal. One such technique involves discharging the molten slag into slag pots which are transported by means of cranes and/or rail cars from the furnace to a relatively remote disposal location. Further processing of the slag, e.g., for metal recovery or fertilizer production, requires that the solidified slag be broken up from relatively large pieces, with extra equipment at substantial cost.

As amplified in my aforementioned parent application, such multi-step batch methods of handling molten steel slag are not only costly from the viewpoint of slag handling, but also have serious inherent shortcomings whereby improvement on such methods is essential to minimize or avoid production delays, and is a matter of serious concern to the entire steel making industry.

The invention described in my parent application Ser. No. 428,519, is a steel slag granulating system including method and apparatus which permit substantially continuous processing and removal of steel slag discharged from the furnace, without delay in the steel making process. In particular, the steel slag granulating system of my parent case comprises a receptacle into which the red hot molten slag from the steel furnace is discharged and in which it is suddenly cooled and granulated by jets of water injected into the granulator to intercept the stream of molten slag. The result is the formation of relatively small, discrete particles of granulated slag which may then be discharged from the granulator and transported by continuous mechanical or hydraulic conveyor means to a suitable storage or disposal facility.

The subject matter of the present application is an overall "closed" hydraulic steel slag granulating and processing system incorporating the granulator system of my parent case. In the present system, granulation and cooling of the molten steel slag in the above-described manner of my parent case is followed by the convenient transportation of the slag from the granulator in the form of a water-slag slurry and the subsequent separation of the water and the granulated slag. The dried slag may then be stored, e.g., in bins or in open pits or directly on the ground, prior to further processing, use, or other disposal. In the present invention, the system is a closed hydraulic loop whereby the recovered water is suitably cooled and returned for further injection into the steel slag granulator, with sufficient additional water added to compensate for water loss as steam during the granulation process or for incomplete recovery of water from the slag-water slurry.

The closed hydraulic system of the present invention has several distinct advantages. For example, satisfactory steel slag granulation requires substantial quantities of water. Hence, the capability to recover and reuse portions of the granulating water, may be a great advantage from the standpoint of efficiency and minimum operating costs; where water is in short supply it may well be essential.

Another advantage of the present invention resides in the avoidance of water pollution. The water-slag slurry discharged to the granulator is simply and economically filtered as part of the slag dewatering process to reduce the quantity of solids in the water to a level acceptable in many states. Further, however, utilization of a closed recirculating water granulation system according to this invention obviates the need for further filtration or other treatment to eliminate residual fine slag and dust in suspension in the recovered water, since such small solids concentration (even exceeding anti-pollution discharge limits of some states) can be tolerated in the waters reclaimed and reused in the steel slag granulator of this invention. Moreover, this feature of the invention minimizes problems of state pollution inspection and compliance questions, and in-plant inspection and control of water discharge to public facilities.

Accordingly, it is a general object of the present invention to provide a further improved steel slag granulating system incorporating the steel slag granulator system of my parent application Ser. No. 428,519.

It is a more specific object of this invention to provide an improved steel slag granulating system in which molten steel slag, transported directly from the steel making furnace, is discharged into my granulator system wherein it is rapidly cooled and granulated to form a slag-water slurry from which a substantial portion of the water is subsequently recovered whereby the granulated slag may be stored or disposed of in substantially dry condition.

It is a further specific object of this invention to provide a granulator as described above, in which the water recovered from the slag-water slurry is cooled, and supplemented, if necessary, by additional water and then returned to the granulator for reuse.

It is an additional object of this invention to provide a system as described, which obviates the danger of water pollution due to disposal of granulating water having a high solids concentration by providing a closed system with filtration in which the granulating water is reused.

It is also an object of this invention to provide an improved processing and disposal system for molten steel slag including my steel slag granulator and a closed loop hydraulic transportation and water recovery system.

It is another object to provide a steel slag granulator system with such a closed loop hydraulic arrangement incorporating means to protect the slag granulator water nozzles against particle obstruction and malfunction.

The exact nature of this invention, as well as other objects and advantages thereof, will become apparent from consideration of the following detailed description and the accompanying drawings in which:

FIG. 1 is a schematic side elevation, partially cut away to reveal the essential features of the molten slag feeding, granulation, and hydraulic transport portions of the slag handling system of this invention;

FIG. 2a is an enlarged, fragmentary view of a portion of FIG. 1 showing the construction of the pouring opening in the slag feeding vessel;

FIG. 2b is an enlarged view of a further portion of FIG. 1 illustrating the construction and assembly of the water jet nozzles;

FIG. 5 is a generally schematic view of the slag drying and water recovery portions of the system;

FIG. 6 shows the manner in which FIGS. 1 and 5 are to be assembled (i.e., read with each other) to provide an overall schematic view of the system of the present invention; and FIG. 7 is a generalized schematic view of one suitable modification of the drying and water recovery portions of the system which may be substituted for the arrangement shown in FIG. 5.

Figure 3:
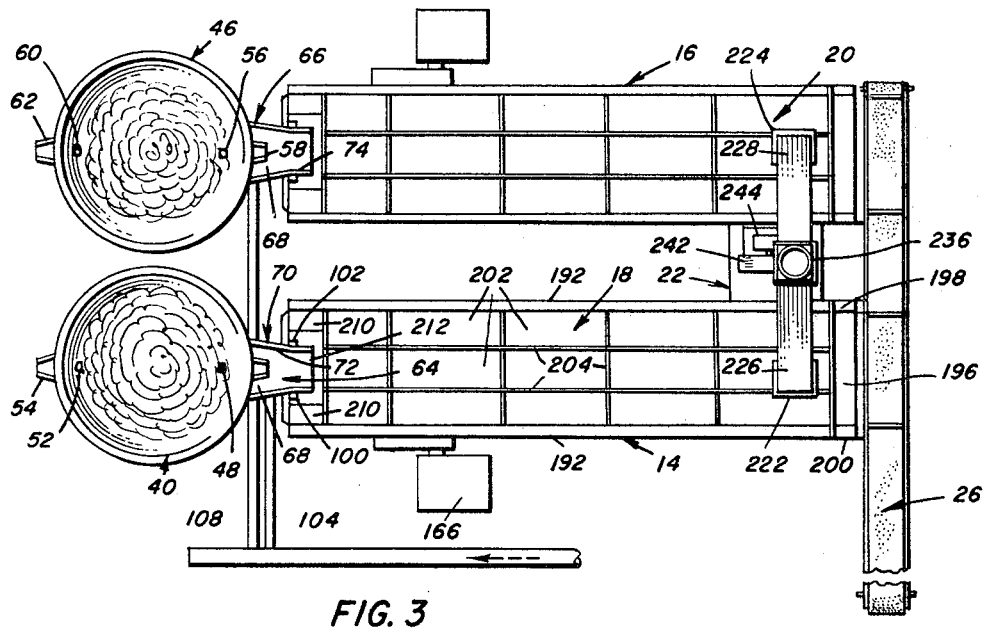
FIG. 3 is a top plan view of the portion of the system shown in FIG. 1.

Referring now to the drawings, and in particular to FIGS. 1-4, the granulating portion of the present invention denoted generally by reference numeral 10, includes molten slag feeding apparatus 12, and granulating apparatus including a pair of similar granulators 14 and 16 disposed adjacent to each other at some convenient location close to the steel making furnaces. Granulators 14 and 16 are fitted with steam hoods 18 and 20, respectively, for reducing uncontrolled emission of steam generated by contact between the red hot slag and the cooling and granulating water. Common steam collection and disposal means, generally denoted as 22, cooperates with steam hoods 18 and 20 to collect steam produced during granulation and to transport it to a remote point for venting to the atmosphere. As described hereinafter, the granulated slag resulting from operation of granulators 14 and 16, is preferably collected and removed from the granulators by means of hydraulic transport apparatus generally denoted as 24. Screening means and an oversized particle conveyor 26 are provided to facilitate convenient handling of large slag particles or other debris which might damage the hydraulic transport apparatus or which, in any event, could not be efficiently transported in the slag-water slurry.

The construction of slag feeding apparatus 12 is illustrated in FIGS. 1, 2a, and 3. The arrangement shown is especially useful when location of granulator system 10 in extremely close proximity to the steel making furnaces is not feasible, e.g., due to space limitations. Here, molten slag is transported from the steel furnace by means of a conventional refractory lined slag ladle or container 28. This is carried by a remotely controlled overhead crane 30 including a pair of spaced lifting hooks such as 32, adapted to engage a pair of trunnions 34 on opposite sides of ladle 28. Crane 30 is also fitted with a separate pouring hook 36 adapted to engage with a lifting bar 38 secured to the bottom of ladle 28 for controllably tilting the ladle on trunnions 34 to discharge the molten slag. Crane 30 is adapted to travel on an overhead track (not shown) into and out of the plane of FIG. 1 and transversely of granulator system 10 in FIG. 3 to permit alignment with either of granulators 14 or 16.

An auxiliary slag receiving vessel 40, supported on a pedestal 42 on the floor 44 of the steel making shop (or in the surrounding yards) and a similar vessel 46 (see FIG. 3), serve as tundishes for feeding molten slag to granulators 14 and 16, respectively, with a controlled rate of flow. The contents of slag ladle 28 may be discharged into either of vessels 40 or 46 by positioning overhead crane 30 at the proper location along its track. This permits backup use of either of granulators 14 and 16 if the other granulator is disabled. The arrangement also allows two different tundish set-ups for two rates of pour of molten slag from crane ladle 28 via the tundish into the respective granulators, if desired for slags having different characteristics as occurs for different type steel heats.

As illustrated herein, tundish vessels 40 and 46 comprise suitably modified steel slag ladles or blast furnace slag pots, although it will be appreciated that specifically designed tundish receptacles may be made and used. Tundish vessel 40 includes slag feeding aperture 48 (see FIG. 2a) cut into the vessel wall at a predetermined level with a pouring spout 50 secured around the opening by welding or in any other convenient fashion.

An overflow opening 52 is also cut into the wall of tundish 40, e.g., diametrically opposite to slag feeding opening 48, and is fitted with an appropriate spout 54. Opening 52 is disposed at a predetermined height above opening 48 and permits overflow to the ground or shop floor 44 if the level of molten slag in the vessel exceeds that of opening 52.

Hence, if the rate of slag flow into vessel 40 from ladle 28 exceeds the rate of discharge through aperture 48, the level of the liquid slag will ultimately exceed the level of opening 52. At that time, molten slag will be discharged to pit 44, thus establishing a maximum slag flow rate from tundish 40 through aperture 48 into the granulator 14; i.e., a maximum pressure head of molten slag is maintained in tundish 40, thereby controlling the rate at which molten slag enters the granulator system. Further, discharge of molten slag to pit 44 via upper aperture 52 alerts the crane operator to reduce the slag input rate by lowering pouring hook 36.

With reference to FIG. 3, the second tundish vessel 46 is of substantially identical construction as tundish vessel 40 and includes a granulator feeding aperture 56, an upper slag overflow opening 60, and a pair of associated spouts 58 and 62, respectively. The relationship between openings 56 and 60 is preferably the same as that between openings 48 and 52 in vessel 40 to assure like operation of both portions of the system. Satisfactory operation may be achieved for openings 48 and 56 having configuration and dimensions as shown in FIG. 2a. Openings 52 and 60 are preferably both in the form of a square about 4 inches on a side. Under such conditions, satisfactory operation may be achieved with the bottom of openings 52 and 60 vertically spaced approximately 2–4 inches above the tops of openings 48 and 56.

The configuration of openings 48 and 56 illustrated in FIG. 2a is preferred because the lower square section 48a establishes the desired rate of slag flow having a head equivalent to the height of section 48a. The flaring upper section 48b provides a linearly increasing area per unit of height from the bottom to the top of section 48b due to the increasing transverse dimension. The increasing area causes the velocity of the molten slag leaving tundish 40 to decrease from the bottom to the top of section 48b so that the molten slag will not have too long a trajectory in relation to the dimensions of granulator 14 and chute 64.

In this regard, it should be appreciated that the 4 inch head specified between openings 48 and 52 may be achieved by location of openings 48 and 56 at the required distance below the lip 61 at the top of vessel 40. In that case, a small notch is preferably provided at the back of the vessel to limit overflow to the region of the ground or pit 44 behind the vessel.

The above described slag feeding apparatus 12 is exemplary of a preferred embodiment but several alternative approaches could be used in light of the disclosure herein. For example, the granulator slag feeding arrangement could incorporate a movable slag runner which can be displaced from association with a slag ladle or like means used for transferring the slag directly from the steel furnace to the granulator utilizing slag runners or chutes analogous to those disclosed in my parent application Ser. No. 428,519, or in my copending application Ser. No. 551,168, filed May 18, 1966, and entitled Steel Slag Handling System, now Pat. No. 3,316,079.

Referring to FIGS. 1 and 3, the slag feeding arrangement employed should preferably terminate in a refractory lined steel discharge chute 64 associated with granulator 14, and a like discharge chute 66 associated with granulator 16. Chutes 64 and 66 are supported by any convenient support means (omitted from the drawings to show the other parts more clearly) and project into granulator receptacles 14 and 16 through suitable openings in the end walls.

As amplified below, it is preferable that the streams of molten slag flowing into the granulators possess minimum velocity components transverse to the primary flow direction, i.e., longitudinally of the chutes. Accordingly, discharge chutes 64 and 66 are formed in any convenient manner with sloping bottom portions 68 and vertical side portions 70. When side portions 70 include inwardly tapered segments such as 72, e.g., to accommodate placement of tundish spout 50 or 58, the chute should include terminal straight-sided portions 74, preferably at least about 1 foot in length to minimize the trajectory of the molten slag transverse to the overall flow direction. Chutes 64 and 66 lie at a suitable angle relative to the horizontal so that the flow of slag into the granulators is gravity-assisted. The angle may be substantially as illustrated in FIG. 1, but can be varied according to varying viscosity of particular molten steel slags, as will be understood by those skilled in the art in light of the disclosure herein.

With continued reference to FIGS. 1–3, each of granulators 14 and 16 is comprised of a boat-shaped tank or receptacle, preferably formed of a plurality of steel plates welded or otherwise attached together to form a watertight structure. With reference to FIG. 1, the side of granulator 14 is shown constructed of steel plates such as 76, 78, 80, and 82, welded together in a conventional manner to form an elongated side wall. The opposite side of granulator 14, as well as the two sides of granulator 16, are similarly constructed. The bottom of granulator 14 is formed of a sloping plate 84 at the upstream (input) end of the granulator, a substantially horizontal rectangular plate 86 forming the central portion of the granulator bottom and a further sloping rectangular plate 88 forming the downstream (discharge) end of the granulator. Plates 84, 86, and 88 are welded to the sides of the granulator in a conventional manner to form a water-tight receptacle as mentioned above.

Secured to the upstream side plate 76, to bottom plate 84, and to the corresponding opposite side plate (not shown) of granulator 14, is an end plate 90, which defines the end closure for granulator 14, and also serves to support a plurality of granulating jet nozzles as described more fully below.

The entire granulator structure is supported by a steel framework including a plurality of spaced vertical legs 92 on both sides of the receptacle, and a pair of like side frame members 94, at the top of the receptacle, secured to legs 92 and to the side plates 76, 78, etc. Legs 92 are arranged to rest on floor 44, e.g., on a stepped portion 95 sufficiently below tundish vessel 40 to achieve the desired slope for chute 64. As will be understood, a like construction is employed for granulator receptacle 16.

With reference to FIG. 2b, granulating and cooling water is injected into granulator 14 by means of a plurality of nozzles including a pair of vertically spaced primary horizontal nozzles 96 and 98 and a pair of horizontally spaced auxiliary vertical nozzles 100 and 102, positioned at the sides of upper primary nozzle 96 (see FIG. 3). Nozzles 96 through 102 are connected by means of a conduit 104 (see FIG. 1) and a common supply pipe 106 to a source of water described more fully below. A conduit 108, similar to conduit 104, provides the water supply to four nozzles in granulator 16 of substantially identical construction as nozzles 96, 98, 100, and 102 in granulator 14.

An extensive discussion of the construction and assembly of nozzles 96 through 102, and of pertinent relationships therebetween, may be found in several of the aforementioned copending applications, e.g., Ser. Nos. 428,519 and 632,825, and therefore, is not repeated herein. Briefly, however, the input ends 97 and 99 of primary nozzles 96 and 98 are connected to conduit 104 by short connecting pipes 103 and 105. The nozzles are constructed in any suitable fashion, e.g., of a plurality of welded metal plates, and are designed to produce a substantially uniform jet stream at the discharge orifices 110 and 112.

Nozzles 96 and 98 project through a pair of slots 114 and 116, in granulator end wall 90. The nozzles are supported in any convenient manner, e.g., by means of a pair of outwardly depending brackets such as 118, secured as by welding, to opposite sides of granulator end wall 90 and each terminating in an outwardly turned flange, such as 122, at the rear end thereof. A pair of like vertically spaced rectangular mounting plates 124 are secured to flanges 122. A rectangular slot 128 is cut in each of plates 124 to receive nozzles 96 and 98 with the discharge ends projecting slightly beyond granulator end wall 90 as shown in FIG. 2b.

In regard to the configuration of the nozzles, it has been found that most satisfactory operation is achieved when the stream of molten slag discharged into granulator 14 through discharge chute 64 intercepts a broad flat generally horizontal jet stream of water produced by each of primary nozzles 96 and 98, the jet streams being somewhat wider than the stream of slag. The vertical thickness of the flat horizontal water jets may be quite small. Thus, the discharge openings 110 and 112 of primary horizontal nozzles 96 and 98 are preferably in the form of narrow, rectangular slits having the longer dimensions thereof extending transversely of granulator end wall 90, i.e., into the plane of the drawing in FIG. 2b. While the dimensions of discharge openings 110 and 112 may be subject to some variation, excellent results have been achieved with horizontal nozzles 96 and 98 having discharge openings approximately about ⅜ inch high and about 14, 18 or 22 inches wide. Detailed discussion of horizontal primary nozzles like 96 and 98 may be found in my parent applications Ser. No. 428,519 and Ser. No. 126,792, incorporated herein by reference. Obviously, similar considerations apply to the primary horizontal nozzles associated with granulator 16.

As explained in my parent applications, other factors are significant in achieving a satisfactory or even an operative system with my granulator arrangement. One such factor is the relationship between the molten slag input rate and the velocity and quantity of water injected through primary nozzles 96 and 98. It has been found that the steel slag granulation system of the present invention preferably should be operated according to certain conditions as set forth below.

(1) In particular, normal steel making operations involve granulation of molten steel slag at rates varying from less than about 2 tons per minute up to as high as about 8 tons per minute. Under such circumstances, granulating water should be supplied through primary horizontal nozzles 96 and 98, such as described above, with a jet velocity in feet per second and a flow in gallons per minute which varies in relation to the rate at which the molten slag is discharged into the granulator. A suitable relationship between varying rates of slag input and the velocity and flow of granulating and cooling water through a single nozzle, i.e., upper nozzle 96, is given in Table 1 below.

TABLE 1.—MINIMUM WATER REQUIREMENTS GRANULATION—PRIMARY NOZZLE 96 ONLY

| Slag Input (tons/min.) | Minimum Water Jet Velocity (ft./per sec.) | Minimum Quantity (gal./per min.) |
| --- | --- | --- |
| Up to 2 | 25 | 400 |
| 2–4 | 30–36.5 | 500–600 |
| 4–7 | 73–110 | 1,200–1,800 |
| 7–8 | 110–122 | 1,800–2,000 |

The velocities given in Table 1 are based on injection of the entire stated minimum water quantity through upper nozzle 96. If both horizontal nozzles 96 and 98 are to be employed, the specified flow may be provided by the combined use of both nozzles. In that case, the jet velocities will be 36.5–35 f.p.s. for slag inputs of between 4 to 7 tons per minute, and 55–61 f.p.s. for a slag input of 7 to 8 tons per minute. However, the velocities for slag inputs of up to four tons per minute are preferably at least those given in Table 1 whether using one or two granulating nozzles.

(2) For most satisfactory operation, it is found that the total quantity of water supplied to receptacles 14 and 16 during operation should exceed the minimum required for injection through nozzles 96 and 98. In fact, the total quantity of water introduced should be at least about 400 gallons of water per minute per ton of steel slag per minute discharged into the granulator. Preferably, however, water should be introduced at a higher rate, e.g., about 900 to 1350 gallons of water per ton of steel slag per minute discharged into the granulator. Most satisfactory results, in terms of minimum vaporization of granulating and cooling water, are achieved by introduction of at least about 1350 to 1600 gallons of water per minute per ton of steel slag discharged per minute. The input water should preferably be at typical water main temperature, (e.g., 60°–70° F.). However, furnace cooling water or other plant-used water may be employed, having a temperature of about 100° F. or above, since the steam removal apparatus described below effectively removes the large quantities of steam which may be evolved under such conditions.

(3) Generally, it is preferable that the water requirements set forth in paragraph (2) be satisfied by supplying all water through primary nozzles 96 and 98, or, as amplified below, partially through auxiliary nozzles 100 and 102 as well. When the auxiliary nozzles are not employed, and if the requirements of Table 1 can be met with a lower quantity of water through nozzles 96 and 98 than the total required by paragraph (2), the excess may be supplied by other means; e.g., a water pipe of suitable size may be secured to end wall 90 of granulator receptacle 14 below nozzle 96, to supply additional water to the receptacle by conduit from a suitable source. However, the safest and best approach is to introduce all the required water through nozzles 96 and 98. This increases the effectiveness of the water jets for breaking down the molten steel slag into small particles to achieve more rapid and more efficient slag cooling and granulation, and helps assure smaller resultant granulated slag particles for more efficient hydraulic slurry transportation.

(4) In light of the foregoing, good results can be achieved by injecting two jet streams of water into granulator receptacles 14 and 16 through primary nozzles 96 and 98 according to the following: (a) For molten slag input of up to about 2 tons per minute, inject two water streams with jet velocity of about 36.5 to 61 f.p.s., and about 1200–2000 g.p.m. through both jets. (b) For a molten slag input rate of 2 to about 4 tons per minute, inject tow water jet streams at a velocity of at least 61 to 122 f.p.s., and about 2000–4000 g.p.m. through both jets. (c) For a molten slag input rate of 4 to about 7 tons per minute, inject two water jets streams at a velocity of at least about 91 to 146 f.p.s., and about 3000–5000 g.p.m. through both nozzles.

Auxiliary vertical nozzles 100 and 102 are constructed generally similar to primary horizontal nozzles 96 and 98. As illustrated in FIG. 2b, side nozzle 100 projects through a generally rectangular aperture 134 in granulator end wall 90, while nozzle 102 projects through a like aperture on the opposite side of granulating nozzle 96. Short connecting pipe segments 130 of like construction are provided between the input ends 132 of the auxiliary nozzles 100 and 102 and common water conduit 104. The nozzles are supported in any suitable fashion, e.g., with connecting pipes 130 projecting through a pair of apertures 135 in plate 124 and an aligned pair of apertures 136 in flanges 122 of mounting brackets 118.

As in the case of granulating nozzles 96 and 98, most satisfactory operation for side nozzles 100 and 102 is found to result for nozzle discharge openings 137 having generally narrow elongated cross sections. The nozzles are so positioned that the jet stream issuing through discharge orifice 110 of upper primary nozzle 96 lies intermediate the upper and lower edges of the streams issuing from side nozzles 100 and 102. Preferably, however, horizontal nozzle 96 is so disposed that the jet stream issuing therefrom lies at or below the center of streams issuing from the vertical side nozzles to produce a combined water stream having a generally U-shaped cross section. (The latter term is intended to include the specific H-shaped cross-section shown in FIG. 2b.)

Further details of the above described construction, as well as an extensive discussion of its advantages may be found in my above referred to copending application Ser. No. 632,825. Briefly, however, as described therein, under many circumstances the stream of molten slag being discharged into the granulator is found to possess a trajectory including substantial velocity components transverse of the primary direction of slag stream flow. Such a condition results in portions of the slag stream failing to intercept the horizontal jet streams produced by nozzles 96 and 98 with resulting non-uniform granulation and cooling of the molten slag. By the employment of the vertical side nozzles 100 and 102, transversely moving portions of the slag stream are either deflected back into the main portions of the stream by contact with the vertical portions of the water jet, or are actually intercepted and granulated thereby while the main body of the slag stream continues to intercept the horizontal water jets. This has been found to improve the uniformity of system operation under the above-mentioned condition.

The flow rate and jet velocity of the water injected through auxiliary nozzles 100 and 102 is found to be governed by the various considerations discussed above in connection with nozzles 96 and 98 in the paragraphs numbered (1)–(4). However, because the portion of the stream of molten slag having the undesirable transverse trajectory is small in comparison to the overall slag tonnage, the required flow rate and jet velocity is less than the minimum specified in Table 1 above.

(5) Specifically, it is found that satisfactory operation is achieved if at least about 60%, and preferably approximately 70%, of the total water supplied to the granulators is equally divided between the primary horizontal nozzles 96 and 98, with the remaining quantity being equally divided between auxiliary vertical nozzles 100 and 102, provided that the requirements of paragraph (1) above, are met. Thus, with reference to paragraph (4) above, good results are obtained with the added benefit of improved granulation of transversely flowing slag if water is injected into the granulator with a minimum rate of flow and minimum velocity through the various nozzles depending upon the rate of molten slag input to the granulator in accordance with Table 2 below:

TABLE 2.—WATER REQUIREMENTS FOR PREFERRED OPERATING CONDITIONS—NOZZLES 96, 98, 100, AND 102

| Slag Input (Tons/min.) | Nozzles 96 and 98 | | Nozzles 100 and 102 | |
| --- | --- | --- | --- | --- |
| | (Vel., f.p.s.) | (Flow, g.p.m.) | (Vel., f.p.s.) | (Flow, g.p.m.) |
| Up to 2 | 25–42 | 420–700 | 19.2–32 | 180–300 |
| 2–4 | 42–84 | 700–1,400 | 32–64 | 300–600 |
| 4–7 | 65.5–105 | 100–1,750 | 48–80 | 450–750 |

(6) By way of example, the following conditions are representative of suitable operation of an OSM steel slag granulating system in accordance with this invention, under typical conditions: A total quantity of as much as 37.5 tons of molten OSM steel slag may be discharged into the granulator system over a period of approximately 10–11 minutes; there may be significant variation in the sought-for average 3.5 tons per minute rate for slag poured into the granulator due to practical difficulty in getting a precisely controlled pour. Under such conditions, water is provided to the granulator at the rate of approximately 3500–4000 gallons per minute; of this, approximately 2800 gallons per minute is provided by the horizontal nozzles 96 and 98 with approximately 1400 g.p.m. injected through each nozzle at a velocity of about 84 f.p.s. The remainder, i.e., approximately 1200 g.p.m., is equally divided between vertical nozzles 100 and 102, and is injected at a velocity of about 64 f.p.s. Of course it should be recognized that the above described nozzle construction and mode of operation is employed in granulator 16, as well as in granulator 14. Accordingly, in the interest of brevity, further description of this aspect of the invention will be omitted herein.

Granulators 14 and 16 are so constructed that a portion of the water entering the granulator through nozzles 96, 98, 100, and 102 is retained at the bottom of the receptacle in the form of a relatively shallow bath 142. The level of bath 142 is controlled by overflow means 144 comprising an aperture cut into one of the granulator side plates, such as 80, at the desired bath level. A water overflow chamber constructed of a plurality of welded plates is secured around overflow opening 46 and is connected to an overflow pipe 148 for disposing of the excess water in any convenient manner.

As explained in parent application Ser. No. 428,519 the presence of water bath 142 is quite desirable in providing additional cooling for the granulated slag, but the bath is maintained at a level below the lower primary nozzle 98 to assure that the molten slag intercepts the granulating jets at a level above the bath.

As will be appreciated, suitable means must be provided to move the granulated slag particles from the vicinity of the granulating nozzles and also from the granulator receptacles themselves. One arrangement for achieving this result is a continuous rake conveyor generally designated at 150 in granulator 14. Rake conveyor 150 comprises a plurality of endless chains 154 (e.g. 3) and a series of attached rectangular steel flights 156 which serve as scrapers or rakes for the granulated slag particles. Chains 154 are supported by means of a plurality of drive sprockets 158 rigidly secured to a drive shaft 160 at the upstream end of the granulator receptacle, and by a plurality of idler sprockets 162 secured to an idler shaft 164 at the downstream or discharge end of the granulator. Shafts 160 and 164 are rotatably supported in suitable bearings mounted in any convenient fashion at the side of the granulator receptacle. Drive shaft 160 is connected, either directly or indirectly, (as by a conventional pulley and belt arrangement), to a suitable drive motor (not shown) mounted in a protective housing 166 on one side of the granulator receptacle. As will be understood from FIG. 4, a similarly constructed rake conveyor 152 is employed in granulator receptacle 16. However, it should also be understood that other functionally comparable slag removal means could be employed instead of the rake conveyors illustrated.

The granulated slag particles are carried by the leading surfaces of moving rake flights 156 along the bottom of the granulator and up along sloping bottom plate 188 for further processing in the manner now to be described.

Figure 4:
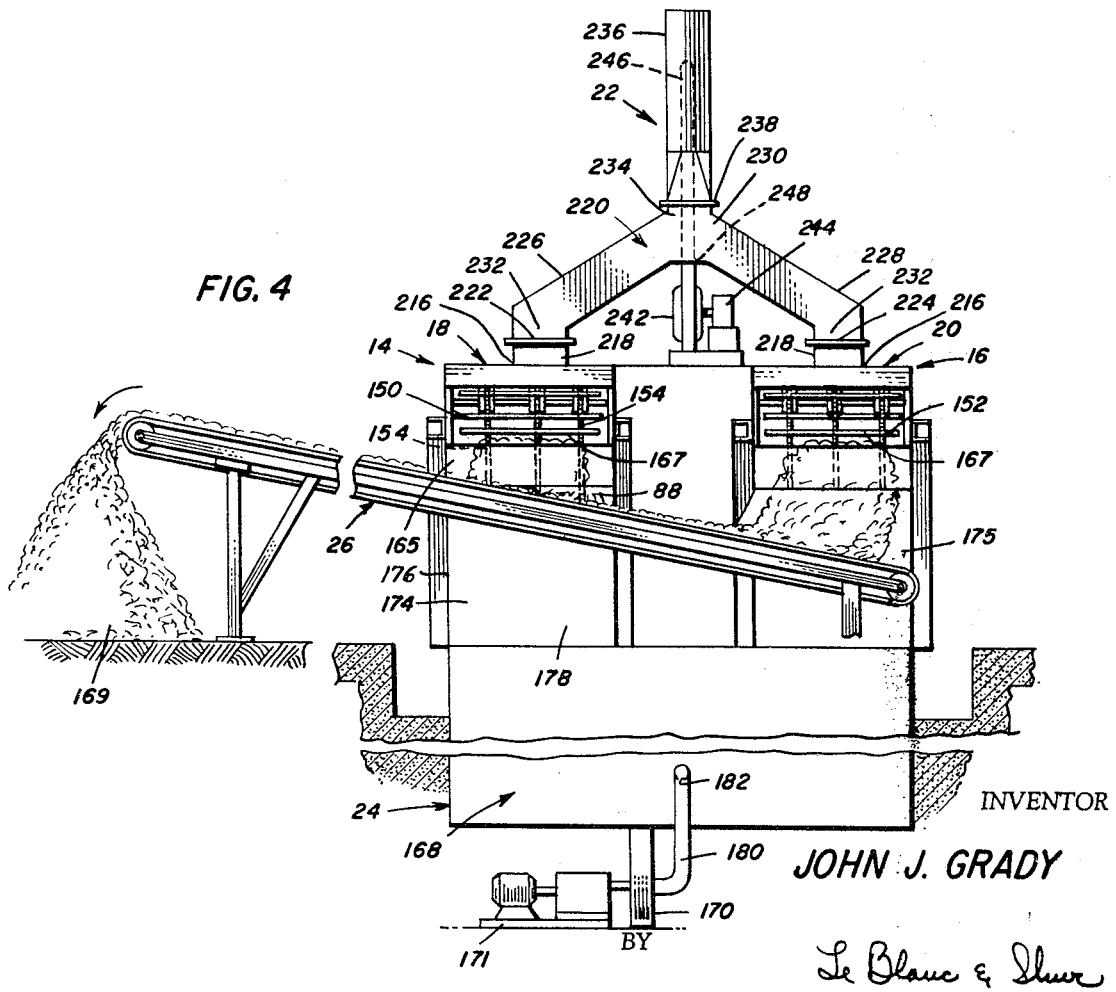
FIG. 4 is an end elevation of the portions of the system of FIG. 1 showing the portion of the system from which the granulated slag is discharged.

As previously indicated, the preferred means for removing the granulated slag particles from the granulator receptacles 14 and 16, is a hydraulic pumping arrangement wherein the granulated slag is transported in the form of a water-slag particle slurry. Accordingly, the system of the present invention includes hydraulic transport system 24 having an auxiliary mixing tank 168 and a slurry pump 170, commonly associated with granulators 14 and 16 as illustrated in FIGS. 1 and 4.

Granuated slag particles are carried by rake conveyors 150 and 152 to the downstream end of the granulators and onto the sloping granulator bottom plates 88. From here, the slag particles and a substantial portion of the injected water is discharged into mixing tank 168 through a plurality of perforations 172 in bottom plates 88. Funnel means 174, constructed of a pair of triangular side plates 176 and a rectangular end plate 178, is attached to bottom plates 88 to guide the slag particles and the water into mixing tank 168. As will be apparent from FIG. 4, a second funnel means 175, identical to funnel means 174, is associated with a perforated bottom plate (not shown) in granulator receptacle 16 identical to perforated bottom plate 88 in granulator receptacle 14, to guide the granulated slag from receptacle 16 into common mixing tank 168 as explained above.

The perforations in the sloping bottom plates 88 are chosen to screen mixing tank 168 against the entry of material of greater than a predetermined size to prevent possible damage to the pumping system, and also, since extremely large particles cannot efficiently be transported in the form of a slurry. In practice, perforations 172 may be formed to admit slag particles having a maximum size of about 2 inches.

The larger material not passing perforated plates 88 continues to be displaced upwardly by the leading edges of the rake conveyer flights 60 until the particles are propelled out of the granulator receptacles 14 and 16 through openings 165 and 167 at the downstream ends. The oversized slag particles and other debris fall onto oversized particle conveyor 26, as illustrated in FIGS. 1, 3, and 4, supported by any convenient means (omitted from the drawings for clearer illustration of other parts), adjacent to the end openings 165 and 167 of the granulator receptacles.

The oversized particle conveyor 26 is preferably a motor-driven continuous belt conveyor of any commercially available type, such as those commonly used in gravel pits or quarries. One suitable type is the Telsmith B–G continuous conveyor, manufactured by the Smith Engineering Works, Milwaukee, Wis. Since such devices area readily available, detailed description of their construction is not necessary.

The oversized slag particles and other debris are carried along by conveyor 26 to a suitable location for disposal or temporary storage such as stockpile 169 shown in FIG. 4. Under most conditions, however, it is found that a large portion of the granulated slag passes through perforated plates 88 and only a small percentage, e.g., less than one percent, must be handled by the oversized particle conveyor 26.

Referring again to the hydraulic transport system 24, the slag-water slurry collecting in mixing tank 168 is removed by means of a large diameter abrasion resistant pipe 180 communicating with the interior of mixing tank 168 through an aperture 182 at the bottom of one of the tank sidewalls.

The discharge end of pipe 180 is connected as the input to a dredge pump 170 which is preferably a commercially available heavy duty centrifugal pump of any suitable design, such as the "Morris" type 10GMA–28. The latter, driven at about 1150 r.p.m. by a suitable motor 171 of approximately 200 H.P. capacity, is capable of handling slurry flow of about 3500 gallons per minute of water plus a solid (i.e., slag particle) content of 3 to 4 tons per minute.

As shown in FIG. 1, connecting pipe 180 preferably includes an elongated vertical portion 184 whereby pump 170 is disposed a substantial distance below the bottom of mixing tank 168. This is desirable to provide a pressure head on pump 170 to minimize inefficiency, and sealing or related problems which may arise in the operation of pump 170 when the water-slag slurry in mixing tank 168 is at a highly elevated temperature, e.g., approaching the boiling temperature of water. As will be appreciated, under certain circumstances dredge pump 170 may be located on a lower floor of the steel making shop to provide the desired head with respect to the mixing tank. Alternatively, as where it is necessary to locate the granulator system in the yard between shops, the required head may be achieved by locating pump 170 in a well 186 dug out beyond the downstream end of the granulator receptacles 14 and 16. Pump 170 is connected by means of a large diameter abrasion resistant outlet pipe 188 to the dewatering and slag disposal portion of the system shown in FIGS. 5 and 7, and described in detail below.

The hydraulic slurry pumping system 24 is described in considerable detail in my aforementioned copending application Ser. No. 535,143 and in the interest of brevity, such description is omitted here. However, certain significant operating conditions have been discovered which should be satisfied for optimum utilization of the slurry pumping system.

It is found that factors pertinent to most desirable operation include the minimum slurry velocity in discharge pipe 188, the concentration of solids in the slag-water slurry, and the slurry temperature in relationship to the head at the input of pump 170.

It is found that best operation is achieved with: (a) Minimum slurry velocity in discharge pipe 180 at least about 17 feet per second; (b) the weight of solids suspended in slurry not significantly exceeding about 17%; and (c) a slurry temperature in mixing tank 168 not significantly exceeding approximately 185° F. (e.g., up to approximately 200° F.).

While many complex factors are significant in design of the system to meet the above requirements, it has been found that adjustment of several parameters results in quite satisfactory operation. Specifically, it is found that for the Morris-type pump 170 operating in the manner described above, input pipe 180 should have an inside diameter of at least about 12 inches and should include a vertical portion 184 to establish a head of about between 10 and 18 feet on the pump input. An output pipe 188 should have an inside diameter of approximately 9 inches, and may be of substantial length, e.g., as much as 1700 feet or more.

In regard to the concentration of solids in the slurry, it will be appreciated that the rate of flow of molten slag into the granulator receptacles 14 and 16, as well as the water input through the jet nozzles 26–30, are significant factors which must be correlated to achieve the desired water-to-slag ratio. One suitable technique for adjusting this ratio is to control the concentration of the slurry in mixing tank 168 by injecting additional water as necessary. This may be accomplished by any suitable valve-controlled piping (not shown in the interest of clarity). Likewise, the temperature of the slurry can be controlled by the injection of additional cooling water into mixing tank 168.

However, control of the solids concentration, as well as the temperature, by injection of sufficient quantities of water into the granulator receptacle itself by the jet nozzles is preferred, as set forth more fully in the aforementioned application, Ser. No. 535,143.

As previously mentioned, granulator receptacles 14 and 16 are fitted with steam hoods 18 and 20, respectively, to prevent the uncontrolled emission of steam generated during the granulating process. As explained in detail in my copending application Ser. No. 629,755, this is extremely desirable since maximum efficiency in the operation of the granulating system requires its location as close as possible in proximity to the steel making furnaces. Uncontrolled venting of steam in such areas may pose an inconvenience or even a safety hazard for nearby workers.

Steam hood 18 is comprised of a side frame 190 having a pair of elongated side members 192 as best illustrated in FIG. 3. The upstream ends of side members 192 each terminate in a downwardly depending portion 194 secured to granulator end wall 90 as shown in FIG. 2. At the downstream end, side members 192 each terminate in an angle portion 196 having a sloping upper leg 198 and a second substantially vertical leg 200 secured at the extreme end of downstream side plate 82.

With reference to FIGS. 1 and 3, the top of steam hood 18 is formed with a plurality of substantially rectangular cover plates 202, connected together in any suitable fashion, as by a plurality of upwardly turned peripheral flanges 204, butt-welded together and to side frame members 192. Similarly, the sides of steam hood 18 are formed of a plurality of generally rectangular plates 206, secured together and to sideframe 192 in the manner described above. Plates 210 are positioned in spaced relationship as shown in FIG. 3, at the upstream end of the granulator to define a recess 212 which exposes slag discharge chute 64 to the atmosphere. No vertical plates corresponding to plates 206 are positioned on the sides of discharge chute 64 so that the entire end of the granulator receptacle above end plate 90 is exposed to the atmosphere.

At the downstream end, a narrow transversely elongated cover plate 214 is secured between upper legs 198 of side frame end portion 196. However, as shown in FIG. 4, the area between vertical leg portions 200 of frame end portions 196, is completely open to define the discharge opening 167 above sloping bottom plate 88. This permits free inflow of air to the granulator receptacle, as amplified below.

As will be appreciated from FIGS. 1–4, the construction of steam hood 20 associated with granulator receptacle 16, is substantially identical to that described above in regard to steam hood 18.

One of the cover plates 202 at the downstream ends of each of granulator receptacles 14 and 16, is provided with a generally rectangular opening 216. Surrounding each opening, is an upwardly projecting connecting collar 218 formed in any suitable manner, e.g., of a short length of rectangular metal ducting having an inner lining of a suitable alkaline resistant material. A common breeching 220 (see FIG. 4), having an inverted V-shaped configuration, is attached, as by pairs of welded flanges 222 and 224, to the connecting collars 218 of steam hoods 18 and 20 respectively.

Breeching 220 is formed of a pair of separate arm portions 226 and 228 welded or otherwise secured to a central connecting portion 230 at the upper ends. Each arm terminates in a short vertical segment 232 at the lower ends, which segments are attached to the respective connecting collar portions 218 on steam hoods 18 and 20.

Arms 226 and 228 and central connecting portion 230 are formed of appropriate lengths of metal ducting, e.g., having a square cross-section 8 inches on a side, and having an internal lining of alkaline resistant material. Breeching 220 is constructed of sufficiently heavy gauge metal to form a substantially self-supporting structure, and may additionally be supported by suitable bracing (not shown) if necessary.

Central connecting portion 230 terminates in a vertical collar portion 234 to which is attached a tubular metallic exhaust conduit or stack 236, for example, by means of a pair of butt-welded flanges 238. As shown in FIGS. 1 and 4, exhaust stack 236 is of relatively short length, however, it should be understood that a greatly extended exhaust conduit may be necessary to reach a sufficiently remote location for convenient and safe venting of the collected steam.

From the foregoing, it may be seen that steam exhaust system 22, including steam hoods 18 and 20, breeching 220, and exhaust stack 236, cooperate to form a temporary collection chamber and disposal conduit for the generated steam. The construction illustrated is especially convenient for use with a pair of adjacent granulators receptacles such as 14 and 16. On the other hand, should more than two granulators be employed in side-by-side relationship, breeching 220 may readily be modified to include additional arms, one communicating with each granulator.

The collected steam may have some tendency to rise through breeching 220 and exhaust stack 236 of its own accord. However, due to the large quantities of steam which may be generated under certain granulator operating conditions, a forced ventilation system for breeching 220 and stack 236 is preferably employed.

One suitable type of forced ventilation system would be a direct arrangement in which a simple air pump or fan is disposed within exhaust stack 236 for drawing the collected steam out of the breeching. On the other hand, because of the corrosive and abrasive nature of the fine particles which may be carried in the steam, an indirect arrangement in which the moving parts of the ventilating system are not themselves subjected to the steam is preferred.

Accordingly, an aspirator arrangement 240, illustrated in FIGS. 1, 3, and 4, is included in steam exhaust system 22. Aspirator 240 comprises a blower 242 driven by an electric motor 244 in any conventional manner. Blower 242 is coupled to a narrow elongated injection tube 246 which extends from the output of the blower through an aperture 248 in the bottom of central connecting portion 230 a substantial distance, e.g., several feet, into exhaust stack 236. The construction and operation of aspirator 240, as well as of the other above described portions of steam removal means 22 is discussed in considerable detail in my above-mentioned copending application Ser. No. 629,755 and such detailed description is omitted here in the interest of brevity.

In short, operation of blower 242 causes a relatively high speed stream of air to be emitted from injection tube 246 into exhaust stack 236. The rapid movement of this air stream establishes a region of depressed pressure in the exhaust stack which is communicated through arms 226 and 228 of breeching 220 and openings 216 in steam hoods 18 and 20 to produce a pressure differential between the interior of the steam hoods and the breeching. The resulting airflow from the open ends of steam hood 18 and 20 into breeching 220 results in the steam generated during granulator operation being drawn up through the breeching and on into exhaust stack 236.

As mentioned above, large quantities of steam may be generated under certain conditions of granulator operation, and exhaust system 22 must be capable of satisfactory operation even at these times. Among the factors which have been found to affect the quantity of steam generated are the nature and flow rate of the molten slag, and the velocity, flow rate, and temperature of the water injected through the jet nozzles. As will be appreciated, satisfactory operation requires proper correlation of the variable design parameters for exhaust system 22 with the above described operating variables. These factors are discussed extensively in my aforementioned application Ser. No. 629,755, particularly in terms of the volumetric exhaust capacity of the aspirator 240 and the associated exhaust conduit 236. In general, it is found that a minimum steam exhaust capacity varying from less than about 1000 cubic feet of steam per minute under ideal conditions to about 300,000 cubic feet of steam per minute for most severe conditions, is necessary.

Referring next to FIG. 5, there is illustrated at 250 the water recover and slag drying portions of a preferred embodiment of the system according to this invention. As will be appreciated, the entire slag handling system described herein is comprised of the portions shown in FIGS. 1 and 5, assembled in the manner indicated in FIG. 6.

Illustrated in FIG. 5, is a first separator 252, a temporary storage bin 254 for the partially dried slag output of first separator 252, a second separator 256, and a second storage bin 258 for the substantially dried slag output of second separator 256.

Also shown is a cooling tower 260 fed by a pair of pipelines 262 and 264, respectively, from first and second separators 252 and 256, and a water storage tank 266 for receiving and temporarily storing the cooled water discharged by cooling tower 260.

Each portion of the system referred to above is preferably gravity fed by the preceding apparatus in the flow chain. Accordingly, dredge pump 170, shown in FIG. 1, is arranged to transport the slag-water slurry through pipe line 188 to an elevated level at the input of first separator 252 while the apparatus for accomplishing subsequent processing steps are preferably placed at succeedingly lower levels. One convenient way to achieve this result is to locate the entire subsystem 250 in one or more enclosed towers with subsequent processing steps taking place at decreasing levels in the tower. On the other hand, it will be appreciated that, where necessary, suitable pumping means may be employed, either to transfer the partially processed slag to a higher level for a subsequent processing step, or to provide an assist for the gravity feed between levels.

First separator 252 serves as the main dewatering apparatus for extracting the granulated slag from the slurry and for reclaiming the cooling and granulating water for subsequent reuse. The slag-water slurry is pumped up to the level of separator 252 through pipeline 188 as described above, and is discharged into the input 268 of the separator. A substantial portion of the water is removed and is discharged at a first output 270 to the water recovery pipeline 262. The partially dried slag passes through a second discharge opening 272 to temporary storage bin 254.

First separator 252 is preferably any one of several commercially available continuous operation high capacity rotary separators. One such device is the so-called "hydro-cyclone separator" such as the "Dorrclone" type FR, manufactured by the Dorr-Oliver Company of Stamford, Connecticut. Since such apparatus and its equivalents are commercially available, detailed description of its construction is not believed to be warranted. Briefly, however, separator 252 comprises a rotating separation chamber, e.g., in the form of an elongated cylinder having perforated side walls serving as discharge apertures for the lighter component of the material being processed and a second discharge opening, i.e., 272, at the lower end of the axis of rotation for the heavier component of the material being processed. Thus, in the present instance, the slurry is injected into separator 252 at input 268, and is separated into a partially dry slag component, discharged at 272, while the extracted water passes through the perforations in the rotating separation chamber and is then collected and discharged at 270 into pipeline 262.

As previously explained, dredge pump 170 is adapted for handling a water flow of approximately 3500–4000 gallons per minute. On the other hand, the "Dorrclone" separator, referred to above, is capable of handling a flow of only approximately 1500 gallons per minute. Since the flow through pipeline 188 may exceed this value by a considerable amount, it may be necessary to provide up to two additional "Dorrclone" separators, operating in tandem, to achieve satisfactory processing of the granulated slag slurry under conditions of maximum load.

Alternatively, pipeline 188 may be connected to an auxiliary recirculating storage tank of relatively high capacity. Such a tank should include a recirculating pump for maintaining the slag particles properly suspended in the slurry and means for controllably bleeding off a portion of the recirculating slurry for injection to a single first separator 252. It is preferable, however, that there be employed several first separators 252 in tandem, rather than a recirculating tank as described above, or that a first separator be selected which has a sufficiently high capacity to handle the maximum expected slurry flow.

The partially dried slag discharged from first separator(s) 252, is fed to a temporary storage bin 254, as previously mentioned. Bin 254 is constructed in any suitable fashion, e.g., of appropriately shaped steel plates welded or riveted together to produce a substantially water-tight structure. Bin 254 is supported in any convenient manner by a framework (not shown) below output 272 of first separator 252. Bin 254 includes a tapered lower portion 274, terminating in a discharge spout 276, preferably fitted with an adjustable closure or valve of any suitable type. Spout 276 is positioned above second separator 256 as explained below to permit direct gravity feed of the partially dried slag. Alternatively, an appropriate conduit may be connected between discharge spout 276 and second separator 256, though it will be appreciated that the direct discharge illustrated in FIG. 5 is preferable by reason of its simplicity.

Second separator 256 is a high efficiency de-watering device, capable of processing the partially dried slag to reduce its water content to as low as about 5–7% and, concurrently, to achieve highly effective water filtration. One type of apparatus that will meet the above requirements is the so-called vacuum dewatering screen or rotary vacuum separator such as the "Horizontal Rotary Filter" manufactured by the aforementioned Dorr-Oliver Company. Since devices of this type are readily available commercially, detailed description is not believed to be warranted.

Briefly, however, the vacuum dewatering screen 256 comprises a shallow, circular housing 278, fitted with a large perforated plate 280 positioned below temporary storage bin discharge chute 276. Plate 280 is adapted to be continuously rotated so that the partially dried slag is deposited in the form of a generally circular ring. An open screw conveyor or scroll 282 is positioned radially of rotating disc 280 and is driven by a motor 284, whereby the slag discharged from spout 276 is spread out over the surface of plate 280.

A conventional vacuum pump (not shown) is connected to housing 278 by means of a vacuum line 288 to establish a partial vacuum below rotating perforated plate 280. This serves to extract the water from the slag. Since the perforations in plate 280 are extremely small, as mentioned above, the granulated slag particles do not pass through.

The continuous rotation of screw 282 causes the granulated slag distributed on plate 282 to be discharged radially from plate 280. The discharged slag is received in a collection trough 286 and then passes through a connecting pipe 288 to storage bin 258 as amplified below. The screw 282 is vertcally movable with respect to plate 280, and it is set at an elevation so that a layer of granulated slag about two to three inches deep accumulates on plate 280. This layer serves as a filtering bed for the water being removed from the slag and has been found capable of reducing solids in the water to below a level acceptable for discharge to public facilities in some states (e.g., from over 1400 p.p.m. to less than 45 p.p.m.). Under the influence of the partial vacuum, substantially the entire water content is drawn from the slag bed and is collected in housing 278 beneath rotating screen 280. The collected water then passes through a series of drain conduits 290 and a common collection pipe 264, the latter ultimately joining discharge conduit 262, as shown, for discharge of the reclaimed water into cooling tower 260.

The rotary vacuum separator described above is one of the most effective means available for achieving substantially complete dewatering of the slag and, at the same time, for providing highly effective clarification of the recovered water. However, the processing capacity of the apparatus shown, is limited to approximately 1–1.25 tons of slag per minute. As previously mentioned, steel mill operation frequently requires the disposal of as much as 3½ tons of slag per minute, e.g., during normal operation of an OSM or BOF or of even larger amounts under certain conditions of steel furnace operation. Accordingly, temporary storage bin 254 is preferably of sufficient size to permit storage therein of a substantial quantity of granulated slag, e.g., bin 254 should be about 550 cubic feet so as to retain at least one pot of OSM slag of up to 40 tons. Slag storage bin 254 preferably also contains means for discharging the stored slag at a controlled rate compatible with proper operation of second separator 256.

The dried slag output of second separator 256 passes downwardly, under the influence of gravity, through a connecting pipe 288, having a generally inverted Y-shaped configuration, as previously mentioned, into storage bin 258.

The latter is constructed of a separate pair of compartments 290 and 292, having separate discharge gates 296 and 298. Each compartment is fed by a separate arm of Y-shaped connecting pipe 288. A hinged gate 294, positioned at the junction of the connecting pipeline arms, directs the granulating slag to one or the other of the compartments 290 or 292 as shown in FIG. 5.

Storage bins 290 and 292 are preferably of sufficient size so that both can store an entire day's output of granulated slag, e.g., as much as 900–1000 tons. Storage bin 258 is supported in any suitable fashion, as by framework (not shown) at a substantial distance above the ground. This is to permit the convenient positioning of a truck 300 or other transporting vehicle beneath one or the other of discharge gates 296 or 298.

As will be appreciated, the granulated slag is then transported to a suitable location for disposal or further processing in substantially dry form. This decreases the weight of the product being transported, reduces the problems of water leakage from the truck 300 in transport and facilitates later drying, treatment. and use of the granulated slag.

The water removed from the granulated slag by first and second separators 252 and 256, is discharged into a water cooling tower 260, as previously mentioned. Cooling tower 260 is of any conventional design, and it is therefore believed unnecessary to describe its construction in detail. It should however, be noted that the temperature of the water extracted from the slurry will generally be at a substantially elevated temperature, often approaching the boiling temperature. On the other hand, most satisfactory granulator operation is achieved when the water injected by means of the nozzles described above in connection with FIG. 2b, is of a temperature not significantly exceeding approximately 100° F. Accordingly, cooling tower 260 preferably should be of sufficient capacity to handle typical maximum water flow rate, e.g., 3500–4000 g.p.m., and to dissipate sufficient heat from the water to reduce its temperature to as close to 100° F. as feasible.

After the cooled water passes through cooling tower 260, it is discharged into a large stand pipe 266 which serves as a temporary storage for the reclaimed water. From here, the water passes through a supply conduit 302 to a recirculating pump 304 for reinjection into the granulator receptacles. Particles or debris may have become suspended in the water during its passage through cooling tower 260, or standpipe 266. Thus, a Y-pattern sediment strainer 306 or like device, should be inserted in water line 106 to remove all debris of size equal to or greater than the smallest dimension of granulator nozzles 96, 98, 100, and 102 (i.e., less than ⅜ inch in the discussed examples). This protects nozzles 96, 98, 100, and 102 from clogging; even a small particle clogging the nozzle tip may cause the jet stream to split, whereby enough molten steel slag may fall directly into the water bath in the granulator, with a resulting danger of explosion. Strainer 306 is of any conventional type, such as that manufactured by the V. D. Anderson Company of Cleveland, Ohio, or the "Aloyco" Y-type strainer manufactured by the Walworth Company of New York City. A similar strainer 307 is preferably provided also in the feed line 102 connecting water storage tank 266 and recirculating pump 304.

Recirculating pump 304 is of any suitable type capable of achieving the required water pressure, velocity and g.p.m. flow, for proper operation of the granulators as set forth in detail above.

While the operation of the system as described is intended to minimize the amount of water lost, either as a result of steam generation or by inefficient dewatering of the granulated slag, it is found that appreciable quantities of water may nevertheless be lost. For example, in order to maintain a constant quantity of water in the closed system, it may be necessary to replace as much as 1500 gallons of water per minute under maximum rate of slag loading of the granulator, and 500 g.p.m. during a typical OSM granulation run such as discussed above.

Accordingly, a supplementary pipeline 308 is coupled into conduit 106, and is connected by suitable pumping means to an external water source, to provide the required makeup water. An automatically controlled valve 310 operated by a valve control 312 is inserted in line 308 to control the quantity of makeup water being injected into the system.

Valve control 312 may be any suitable servo-mechanism system, including a plurality of sensors, indicated by lines 314 and 316 to monitor the water flowing through supply conduit 106 downstream of makeup water pipe 308. As will be appreciated, it may be necessary to monitor several parameters of the recirculating water, including its pressure and g.p.m.

For example, should the pressure or g.p.m. flow of water from recirculating pump 304 fall below the quantity required for satisfactory and safe granulator operation (as set forth in detail above), valve control 312 will open valve 310 to admit to line 106, the required amount of water to re-establish the desired water flow conditions. Thus, this arrangement provides a safeguard also by supplying the granulator nozzles with adequate water in the event recirculating pump 304 should fail to do so. Alternatively, makeup water could be supplied to tank 266 from a line source using a float controlled valve to add water via such source when the level in tank 266 falls below a predetermined limit and to cut off makeup water when the level in tank 266 rises to an upper predetermined limit; this, however, does not provide the discussed safeguard against failure of pump 304 which is provided by the preferred arrangement of FIG. 1.

Referring now to FIG. 7, there is shown an alternative embodiment of the dewatering portion of the system, suitable for use where the dewatered slag is to be stockpiled directly on the ground. The apparatus shown in FIG. 7 is intended to be substituted for components in FIG. 5 including the first separator 252, storage bin 254, second separator 256, and dry slag storage tank 258. The apparatus of FIG. 7 comprises an oscillating separating tank 318 and associated equipment including a flume 320, fed by slurry pipeline 188, water discharge conduit 322, and framework 324 for supporting the settling apparatus 318 above the area where the dewatered slag is to be stockpiled.

Flume 320 is a wide, sloping trough having a bottom member 326 and like side members 328. Flume 320 is supported at a slight angle to the horizontal, e.g., between about 5° and 10° in any convenient manner, such as by a framework omitted from the drawing for clearer illustration of the other parts. A series of vertical rods 330 project upwardly from flume bottom member 326 and serve as velocity killers to reduce the velocity of the slurry entering settling tank 318.

As mentioned, settling tank 318 is of the continuously rocking type, such as is frequently employed in sand and gravel pits, and is commercially available from several sources. The settling tank is comprised of a large metal hopper 334, generally in the form of an inverted pyramid. Hopper 334 is constructed in any suitable fashion, as of a plurality of properly shaped welded plates. Hopper 334 is freely supported by a pair of knife-edged bearings 336 as illustrated, or in any other suitable fashion on framework 324 at a point somewhat downstream (i.e., toward the right in FIG. 7) of its center of gravity. A baffle plate 338 extends completely across hopper 334 and is secured, as by welding, to the opposite side walls of the hopper, preferably directly above knife-edge bearings 336.

As illustrated, hopper 334 tapers downwardly, the taper being defined by a pair of sloping plate members 340 and 342, forming the upstream and downstream sides, respectively, of the hopper, and by additional side plates 343 connected by a short horizontal portion 346 at the truncated apex of the inverted pyramid.

Slag discharge from hopper 334 is provided by means of a drainage opening 348 at the bottom of backplate 340. Opening 348 is normally closed by means of a drainage gate 350, movably supported, as by means of a bellcrank 352, attached through a sloping, connecting rod 354 to a counter-weighting mechanism generally denoted at 356.

Counter-weighting mechanism 356 includes a horizontally elongated balancing arm 358 terminating in a relatively high mass member 360 which serves as the counterweight. Balance arm 358 is pivotally secured in any suitable fashion at 362 to the upper portion of hopper backmember 340, and rests on a suitable support such as knife-edge bearing 364 mounted on framework 324. Connecting rod 354 is pivotally secured to balancing arm 358 to operate drainage gate 350 when hopper 334 oscillates on bearings 336 as now described.

In operation, the granulated slag-water slurry pumped through pipeline 188 by pump 170, is discharged from flume 320 into hopper 334. The slurry 320 strikes baffle 338 and is deflected back to fill hopper 334. As the slurry level builds up, the heavier slag particles settle out of the water to the bottom of the hopper while the water flows under baffle plate 338. When it reaches a sufficient level, the water flows out over the downstream end of hopper 334, e.g., over a transverse spillway to a trough 321. The water is then conducted into discharge pipeline 332 which is connected to a water cooling tower substantially identical to water tower 260 described in connection with FIG. 5. After appropriate cooling, the water is collected in a standpipe or storage tank, again identical to that described in connection with FIG. 5. The water may then be injected into the granulator with sufficient makeup water being added to compensate for that lost during the granulating and dewatering process.

Referring again to FIG. 7, as the weight of the slag, collecting at the bottom of hopper 334, becomes sufficient, the unbalance about knife-edged bearings 336 will cause the hopper to tilt slightly in the counter-clockwise direction. Since counter-clockwise rotation of balance arm 356 is prevented by support bearing 364, bell crank 352 and attached drainage gate 350 remain fixed, while pivoting of the hopper causes drainage opening 348 to be exposed. This results in discharge of the relatively dry granulated slag particles from the bottom of hopper 334 onto the slag stockpile 347 below.

When a sufficient quantity of slag has been discharged, hopper 334 becomes unbalanced in the opposite direction, causing it to swing back in the clockwise direction toward its initial position. Counter-weight 360 maintains balance arm 358 in a horizontal position, causing drainage gate 350 to be closed and preventing further slag discharge. Since only a portion of the slag collected at the bottom of hopper 334 is discharged at a given time, there is always maintained a relatively deep slag bed in the hopper above which the water is collected. This prevents discharge of water through drainage gate 348. At the same time, the continuous oscillatory motion of hopper 334 imparts an oscillatory movement to the slurry at the top of hopper 344 which promotes separation of the slag and water and results in a more rapid settling out of the slag particles.

The slag discharged from settling tank 318 is relatively water free, generally containing less than about 20% water. Since the granulated slag is stockpiled directly on the ground, most of the remaining water will run off or filter down through stockpile 347 and be absorbed into the earth.

As previously mentioned, the above-described settling tank 218 is a commercially available device frequently used for dewatering sand or like material. One suitable device of this type is the so-called Telsmith sand tank, manufactured by the Smith Engineering Works. Such Telsmith sand tanks are capable of handling 1700 or more gallons of slurry per minute and of extracting about 135 tons of granulated slag per hour (i.e., approximately 2.25 tons per minute). Since maximum load operation of the granulators may produce slurry flow in excess of these amounts, a buffer tank, including a recirculating pump and a controlled slurry takeoff as described above, may be connected between slurry pipeline 188 and the input of flume 320. Preferably, however, a series of sand tanks 318, operating in tandem, should be employed with sufficient overall capacity to handle the maximum expected slurry flow. As will be appreciated, suitable connecting troughs and runners, to distribute the slurry uniformly among all of the settling tanks employed, are connected at the output of pipeline 188 and feed an open flume 320, associated with each settling tank.

Thus, there has been described above a novel system for processing molten steel slag to convert it to a cooled and granulated product which can be conveniently transported to a remote location and stored or disposed of in a continuous manner without disruption of the normal steel making process. The system includes the granulating system of my parent applications, and associated molten slag feeding equipment, steam control means to prevent undesired emission of steam generated during the granulating process, and means for transporting the granulated and cooled slag in the form of a water-slag slurry. The system further includes means for dewatering the slag, and reclaiming the water for reuse in the granulating process, the latter being especially desirable since it reduces the water requirements for the system and also since it avoids problems attendant upon disposal of the used water.

However, it should be recognized that numerous design variations of the above-described system are contemplated and will be readily apparent to one skilled in the art in light of the above disclosure. Moreover, where commercially available components have been described, it should be understood that substitution of equivalent or similar units for those specified is also contemplated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of handling molten steel slag from a steel-making furnace comprising; pouring molten steel slag into a receptacle; injecting at least one jet stream of water into said receptacle to intercept said molten steel slag to granulate said slag into particles; said water jet stream being injected at a rate of at least 400 g.p.m. per ton of molten steel slag input per minute with a water jet velocity ranging from at least about 25 f.p.s. for a slag input rate of up to 2 tons per minute to at least about 55–61 f.p.s. for a slag input rate of up to about 8 tons per minute; maintaining the water accumulating in said receptacle at a level below said water jet streams at all times while molten steel slag is being poured into said receptacle so that the molten steel slag intercepts said jet stream above the water accumulated in said receptacle; removing resultant granulated slag particles from said receptacle while granulation of the molten steel slag is in progress; transporting said granulated slag away from said granulator in the form of a water slag slurry, extracting the slag from said slurry to permit storage and disposal of said granulated slag in relatively dry form, recovering the water; and recirculating said recovered water for reinjection into said granulator receptacle or at least one jet stream as above-recited.

2. A method of handling molten steel slag as defined in claim 1 wherein said recovered water is cooled prior to reinjection into said receptacle so that the temperature of the recirculated water plus any makeup water, is less than approximately 110° F. when injected into said granulator.

3. A method of handling molten steel slag comprising; pouring molten steel slag into a receptacle; injecting at least one jet stream of water into said receptacle so as to intercept said molten steel slag to granulate the molten slag into particles; the water stream being injected with a jet velocity of at least about 25.0 f.p.s. and at least about 400 g.p.m. for a molten slag input rate of up to about 2 tons per minute, the water stream being injected with a jet velocity of at least about 30 to 36.5 f.p.s. and at least about 500 to 600 g.p.m. for a molten slag input rate of 2 to about 4 tons per minute, the water stream being injected with a jet velocity of at least about 36.5 to 55 f.p.s. and at least about 1200 to 1800 g.p.m. for a slag input rate of 4 to about 7 tons per minute, and the water stream being injected with a jet velocity of at least about 55 to 61 f.p.s. and at least about 1800 to 2000 g.p.m. for a slag input rate of 7–8 tons per minute; maintaining water accumulating in said receptacle at a level below said jet stream while said molten steel slag is being poured into the receptacle so that the molten steel slag intercepts said jet stream above water accumulated in the receptacle; removing resultant granulated slag particles from said receptacle while the granulation of the molten steel slag is in progress; transporting said granulated slag away from said granulator in the form of a water-slag slurry; extracting the slag from said slurry to permit storage and disposal of said slag in relatively dry form, recovering the resultant water, returning said recovered water to said granulator for reinjection and supplementing said recovered water from an external source to the extent necessary so that water is injected into said granulator receptacle in one or more streams with jet velocity and flow rate as above-recited.

4. An apparatus for handling and treating molten slag comprising: a slag granulator including a receptacle; means for feeding molten slag into the receptacle; nozzle means for injecting one or more jet streams of water into the receptacle to intercept the molten slag and to granulate said slag into particles; means for maintaining water accumulating in the receptacle at a level below the jet streams while said molten slag intercepts the jet streams above the level of the water accumulated in the receptacle; hydraulic transport means for transporting the granulated slag away from the granulator in the form of a water-slag slurry; dewatering means for separating granulated slag from the water in said flurry, water recovery means cooperating with said dewatering means for returning water from said slurry to said nozzle means for reinjection into the slag granulator.

5. Slag handling apparatus as defined in claim 4 wherein said slag feeding means comprises: a slag container; means for conveying said slag container from the location of a furnace to the location of said granulator; an auxiliary tundish; said conveying means including means for controllably pouring the contents of said container into said tundish; said tundish including a wall having a pouring opening therein, overflow means in the wall of said tundish at a predetermined level above said pouring opening to limit maximum head of molten slag in the tundish above said pouring opening; and means for guiding molten slag discharged through said tundish pouring opening into said granulator receptacle to intercept said jet streams of water.

6. Slag handling apparatus as defined in claim 4 whereing said dewatering apparatus comprises: first separator means for removing a substantial portion of the water from said slurry, first means for receiving the extracted water and conducting same to said water recovery means; second means for receiving said substantially dewatered slag; second separator means connected to said second slag receiving means for removing a further quantity of water from said granulated slag; third receiving means for conducting the water extracted by said second separator to said water recovery means; and fourth receiving means for storing the dewatered slag output of said second separator means.

7. Slag handling apparatus as defined in claim 6 wherein said water recovery means comprise water storage means connected to said first and third receiving means; recirculating means connected to said water storage means, said water recirculating means comprising pump means connected to an outlet of said water storage means; a conduit connected between the output of said pump means and said nozzle, an external source of makeup water connected to said conduit; control means to adjust the amount of makeup water to compensate for loss of water during operation of the granulator system; and means in said conduit to prevent passage of solids as large or larger than the smallest dimension of said nozzle means, thus preventing solids in such recirculated and makeup water from obstructing said nozzle means.

8. Slag handling apparatus as defined in claim 6 wherein said first separator means comprises a body for receiving said slag-water slurry, means for rotating said body to effect separation of the water from the heavier slag particles, and wherein said second separator means comprises a rotary vacuum separator having vacuum means to remove residual water from said partially dewatered slag and to convey said water to said third receiving means; and mechanical conveyor means for transferring the vacuum dewatered slag to said fourth receiving means.

9. Slag handling apparatus as defined in claim 4 wherein the water recovery means comprises: water storage means connected to said dewatering means; recirculating means connected to the outlet of said storage means; a source of makeup water; means for combining water from said recirculating means with a quantity of makeup water; and control means for adjusting the flow of makeup water relative to the recirculated water.

10. Slag handling apparatus as defined in claim 4 wherein said feeding means includes a slag receiving vessel and means for transferring the slag from said vessel into said granulator receptacle at a controlled rate.

11. Slag handling apparatus as defined in claim 10 wherein said transferring means further includes a wall having a slag flow aperture therein, and means for establishing a maximum rate at which molten slag is transferred to said granulator receptacle.

12. Slag handling apparatus as defined in claim 11 wherein said means for establishing a maximum rate of slag flow to the granulator comprises means to permit overflow of slag from said vessel when the quantity of molten slag therein exceeds a predetermined head with respect to said aperture through which molten slag is poured into the granulator.

13. Slag handling apparatus as defined in claim 4 wherein said feeding means comprises a slag container for receiving slag outflow from a metal refining furnace and means for tilting said slag container to transfer molten slag from said slag container at a controlled rate.

14. Slag handling apparatus as defined in claim 13 further including a slag receiving vessel positioned to receive the slag from said slag container when the latter is tilted, said vessel including a wall having a slag pouring aperture therein, and means for establishing a maximum limit on the rate at which molten slag is poured into said granulator through said aperture.

15. Slag handling apparatus as defined in claim 14 wherein said means for establishing a maximum limit on the rate of slag flow to said granulator receptacle comprises means to permit overflow of slag from said vessel when the quantity of molten slag therein exceeds a predetermined head with respect to said aperture in said vessel wall.

16. Slag handling apparatus as defined in claim 4 wherein said dewatering means comprises settling tank means for receiving said granulated slag-water slurry; said settling tank means having first discharge means for granulated slag separated from the water in said slurry, and second discharge means for receiving the residual water; means for storing said residual water; means for returning said residual water to said granulator; and means for supplementing said residual water with additional makeup water as necessary to compensate for water lost during operation.

17. Slag handling apparatus as defined in claim 16 wherein said settling tank means comprises body means for receiving said slurry; means for movably supporting said body, said support means being so positioned in relation to the center of gravity of said body that the latter is unbalanced when sufficiently filled with granulated slag, said unbalance causing said body to tilt in a given direction on said support means; closure means normally preventing slag flow through said first discharge means, but responsive to said tilting to open said first discharge means; the resulting outflow of granulated slag causing an opposite unbalance of said body and consequent return toward the original position; the resulting oscillatory motion of said body serving to promote slag-water separation; and wherein said second discharge means comprises means near the top of said body for receiving water collected above the level of granulated slag settling in said body.

References Cited

UNITED STATES PATENTS

| 1,888,394 | 11/1932 | Schol | 65—141 |
| 2,136,988 | 11/1938 | White | 65—141 |
| 2,210,999 | 8/1940 | Bartholomew | 65—141 |
| 3,316,075 | 4/1967 | Grady | 65—19 |
| 1,916,402 | 7/1933 | Allen | 65—19 |

FOREIGN PATENTS 562,523   8/1958   Canada.

S. LEON BASHORE, Primary Examiner

E. R. FREEDMAN, Assistant Examiner

U.S. Cl. X.R.

65—20, 141, 159, 160

PO-1050
(5/69)

UNITED STATES PATENT OFFICE
CERTIFICATE OF CORRECTION

Patent No. 3,523,015            Dated August 4, 1970

Inventor(s) JOHN J. GRADY

It is certified that error appears in the above-identified patent and that said Letters Patent are hereby corrected as shown below:

Column 6, line 4, "spout" should read -- spouts --. Column 10, line 60, "granluated" should read -- granulated --. Column 11, line 26, "area" should read -- are --. Column 12, line 10, after "180" insert -- of --; line 66, "with" should read -- of --; Column 14, line 25, "hood" should read -- hoods --. Column 16, line 32, "vertcally" should read -- vertically --. Column 21, line 43, "flurry" should read -- slurry --; line 62, "ing" should read -- in --

SIGNED AND
SEALED
MAR 16 1971

(SEAL)
Attest:

Edward M. Fletcher, Jr.
Attesting Officer

WILLIAM E. SCHUYLER, JR.
Commissioner of Patents